F. KEMPTER.
RUBBER MIXING MACHINE.
APPLICATION FILED JUNE 6, 1914.

1,260,684.

Patented Mar. 26, 1918.
2 SHEETS—SHEET 1.

WITNESSES
Charles D Crompton
May G. Luttrell

F. KEMPTER.
INVENTOR
BY Croydon Marks
ATTORNEY

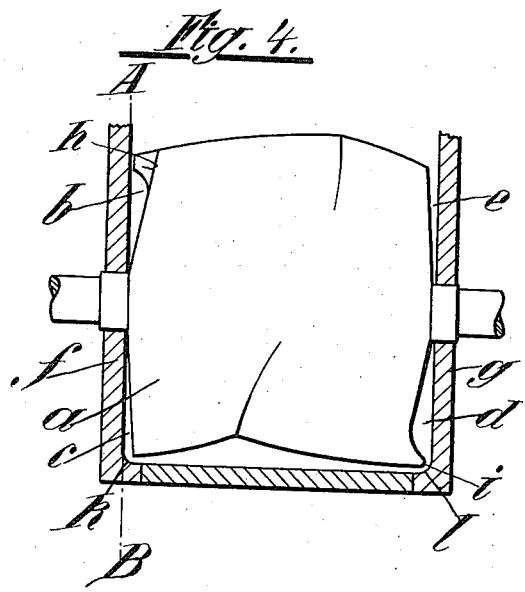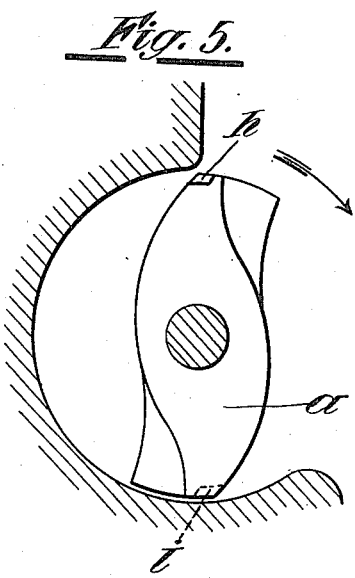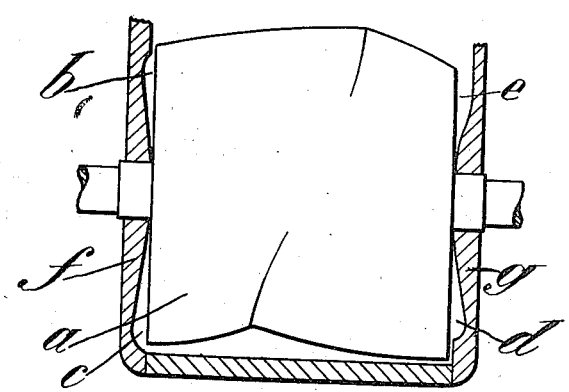

UNITED STATES PATENT OFFICE.

FRITZ KEMPTER, OF STUTTGART, GERMANY, ASSIGNOR TO CANNSTATTER MISCH- UND KNETMASCHINENFABRIK, CANNSTATTER DAMPF-BACKOFENFABRIK WERNER & PFLEIDERER, OF CANNSTATT, WURTTEMBERG, GERMANY.

RUBBER-MIXING MACHINE.

1,260,684.  Specification of Letters Patent.  Patented Mar. 26, 1918.

Application filed June 6, 1914. Serial No. 843,450.

*To all whom it may concern:*

Be it known that I, FRITZ KEMPTER, a subject of the Emperor of Germany, and residing at 10 Heinestrasse, Stuttgart, Wurttemberg, Germany, have invented certain new and useful Improvements in Rubber-Mixing Machines, of which the following is a specification.

My invention relates to improvements in rubber mixing machines. For the preparation of rubber mixtures the commonly known mixing rollers have been employed which effect a kneading and grinding process. These machines possess considerable disadvantages because they do not work automatically, but require constant manual attention and are very dangerous for the operator. In addition to this, the success of the mixture is entirely dependent upon the skill and attention of the workman.

For the above reasons an automatic machine has long been sought after and those kneading machines of the type of the known Werner and Pfleiderer system have been employed with success, at least for easily prepared soft mixtures, especially of gutta-percha. For actual rubber manufacturing purposes, however, in which it is necessary to homogeneously knead large quantities of filling materials, including those of crumbly and granular nature, such as factis, rubber-waste, resinous bodies or the like with a proportionately small quantity of raw rubber, this mixing has not yet been successfully effected because all of these kneading machines effect only a kneading process, whereas for obtaining perfectly uniform mixtures of the above described class, a simultaneous grinding effect, such as takes place with mixing rollers, is indispensable.

According to my invention I have succeeded in attaining a simultaneous automatic grinding effect even with automatically working kneading machines, thus dispensing with manual labor and without the addition of new parts to the machine.

This important progress is obtained in a simple manner by forming the kneaders (kneading beaters or roller), or the side walls of the mixing trough, or both, so that the end surfaces of said kneaders are not close to the said walls, as has hitherto been the case, but between the end surfaces of the rollers and the side walls of the mixing trough an intermediate space is left of such size and formation, that between said two surfaces, the mass manipulated by the kneaders can penetrate into said space and then be subjected to a thorough grinding process.

My invention is illustrated by way of example in the accompanying drawings, in which:—

Fig. 4 is a longitudinal section of another modification,

Fig. 5 is a section on the line A—B of Fig. 4, and

Fig. 6 is a longitudinal section of another modification.

The kneaders $a$ and $b$ are of a proved suitable form for the kneading process and of thickness to correspond to their special purpose. Said kneaders are provided with wide end surfaces, as shown especially by the section near to the end surfaces in Fig. 1.

Figure 1:
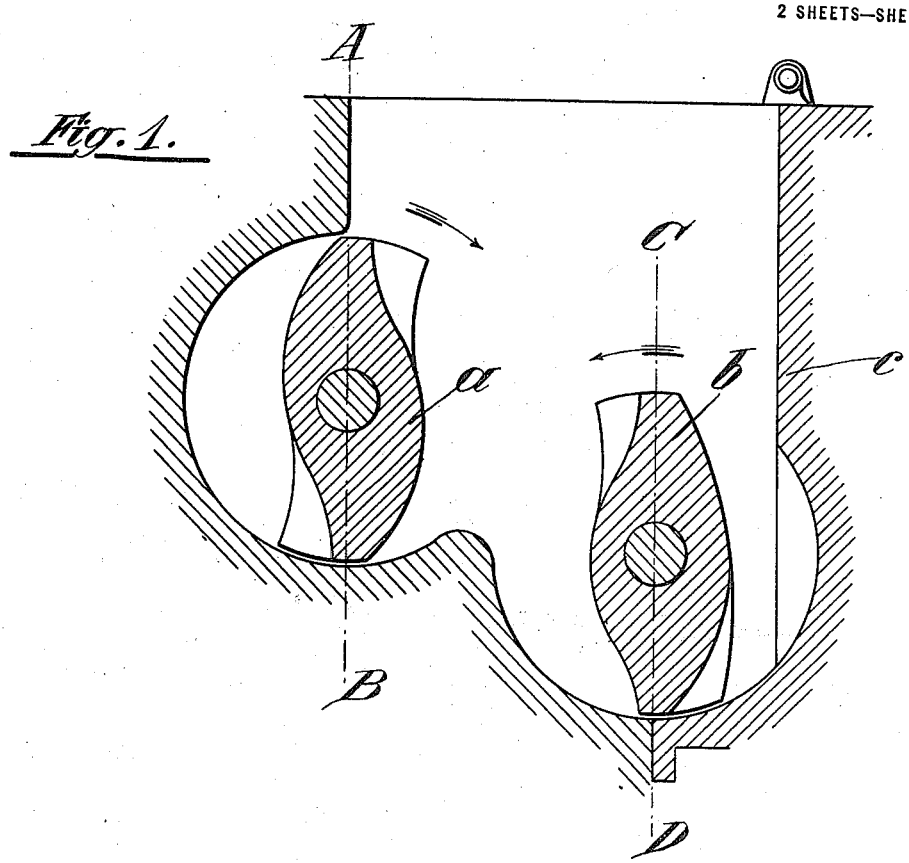
Figure 1 is a section through the trough and the two kneaders vertical to the axes of the kneaders, near to the trough side walls.
Figures 2, 3:
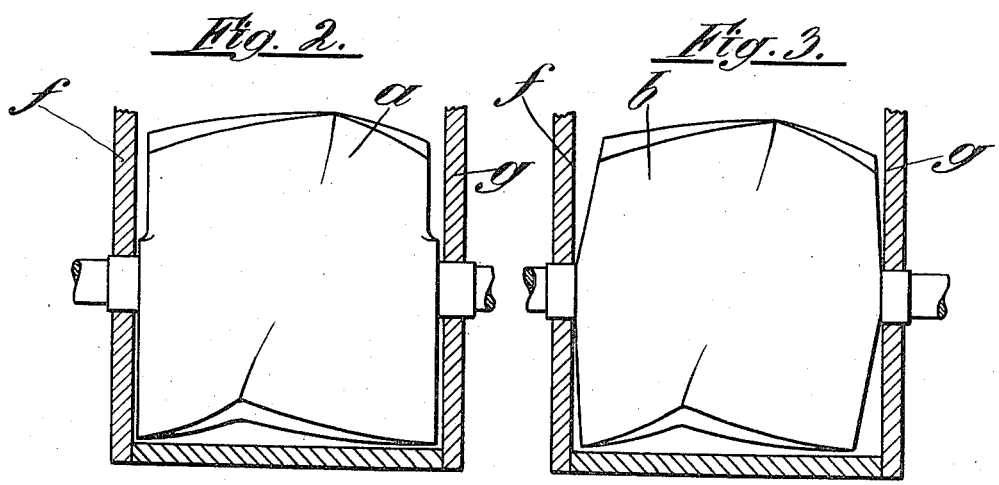
Fig. 2 is a longitudinal section on the line A—B of Fig. 1.
Fig. 3 is a section on line C—D of Fig. 1.

The rollers rotate in opposite directions toward each other as shown by the arrow in Fig. 1. The front wall $c$ of the trough may be raised for the purpose of emptying the kneading trough.

So far, the machine does not differ from known rubber kneading machines. Hitherto, however, the kneaders were always carried as closely as possible to the side walls $f$ and $g$ of the trough to prevent the mass penetrating between the kneader and the trough wall, but according to my invention I intentionally leave an intermediate space between the kneader end surfaces and the trough walls of such size and formation that the mass can penetrate into said space and be squeezed through same, thus being subjected to a thorough grinding effect.

It has been shown by practice that the end surfaces are preferably of wedge-formation increasing in size from the axis toward the circumference of the kneaders. This arrangement causes a regular automatically progressive and constantly repeating grinding of the whole mixture in such a manner that on each kneading revolution, a part of the mixture naturally pressed against the side walls of the trough is subjected to a thorough grinding effect between the end surfaces of the rotating kneaders and of the fixed trough walls.

The above mentioned wedge-formation of the end surfaces of the kneaders also has the effect that the mixture pressed in between the grinding surfaces tends to move toward the periphery of the kneaders and escape the grinding, thus causing a continual rapid change of the mixture between the grinding surfaces. With rubber mixtures the ground material flows continually away from the periphery of the kneader in the form of a rolled band and is then immediately caught by the kneaders and again united with the remaining mixture.

It is of the greatest importance to effect a rapid removal of the mixture from the grinding surfaces as a too long grinding has a bad effect. The wedge formation of the grinding surfaces further effects a rapid complete forcing out of the mixture on emptying the machine.

The shape of the kneaders and especially of the grinding surfaces, as well as the size of the grinding space and of the distance of the kneaders from the walls is selected according to the properties of the mass to be manipulated and the intended effect. In many cases it is preferable to make the grinding surfaces of dissimilar formation. If necessary, the grinding spaces may be omitted from certain of the kneader end surfaces. The number of the kneaders is not limited to two nor is their arrangement restricted to the arrangement illustrated.

It is also possible to obtain the necessary formation of the grinding space by correspondingly forming the trough wall and providing the kneader with level and vertical end surfaces or even provide also the kneaders with specially formed end surfaces.

Figs. 4 and 5 illustrate a special formation of the kneader end surfaces of this type by whose intermediary an especially regular and intensive circulation is obtained.

The mass arriving in the grinding spaces between the end surfaces of the mass and the side walls of the trough tends generally to work back behind the kneading beaters in the form of an inwardly winding tape. In addition to this, there exists in the grinding space the tendency to force the mass under high pressure out radially beyond the periphery of the kneaders at those places where the direct effect of the kneaders upon the mass ceases, into the trough corners $k$, $l$. With certain kinds of rubber mixtures there is a danger, with this high pressure, that parts of the mixture adhere at these points and thus be withdrawn from the manipulating process.

This is prevented according to my invention by the kneaders and the end surfaces being approached toward each other at those points of largest circumference of the kneader end surfaces, to such an extent, that at said points the kneaders work as scrapers and prevent the masses adhering in the corners.

The kneaders $a$ of the machine, of which one is illustrated (Figs. 4 and 5) are of a shape suitable for the lengthy kneading effect and are preferably of different thicknesses at their end surfaces or else diagonal so that between them and the side walls $f$ and $g$ of the trough, grinding spaces $b$, $c$, $d$, $e$ are obtained.

At the points $h$ and $i$, preferably once on each of the two end surfaces, the kneaders extend close to the trough side walls, so that at these points the ground mass is subjected to a scraping effect. The projections $h$ and $i$ need not extend for the whole width of the kneader end surfaces, as shown in Fig. 5.

As shown in Fig. 4, the projections or scrapers $h$ and $i$ preferably gradually develop out of the kneading space, sharp bends being avoided, so that the mass does not adhere at the points of transition.

It is not necessary that the grinding spaces be of different formation among themselves, but it is sufficient even with similar grinding spaces to provide one scraping projection on each kneader end surface.

The grinding spaces can also be obtained by giving to the trough wall a corresponding irregular formation, as shown in Fig. 6. It is preferable to round off the trough corners and the scrapers as shown at $i$ in Fig. 4.

Having now described my invention what I claim as new and desire to secure by Letters Patent is:—

1. The combination, in a kneading machine for rubber or the like, of a kneading trough and kneaders mounted therein having wide end surfaces of a diameter substantially as large as the intermediate part of the kneader, said surfaces being spaced from the side walls of the trough so as to permit the mass to penetrate into the space and be subjected to a grinding effect, the front faces of said kneaders having forwardly projecting portions between the side edges of said front faces whereby to direct the material being kneaded toward the spaces between the side edges of the kneaders and the side walls of the trough.

2. The combination, in a kneading machine for rubber or the like, of a kneading trough and kneaders mounted therein having wide end surfaces of a diameter substantially as large as the intermediate part of the kneader, part of said surfaces being spaced from the side walls of the trough so as to permit the mass to penetrate into the space and be subjected to a grinding effect, the front faces of said kneaders having forwardly projecting portions between the side edges of said front faces whereby to direct the material being kneaded toward the spaces between the side edges of the kneaders and the side walls of the trough.

3. In a kneading machine for rubber or the like, the combination of a kneading trough and rotatable kneaders mounted therein having wide end surfaces, said end surfaces being spaced from the side walls of the trough except at certain points situated at the largest diameter of the kneaders, the front faces of said kneaders having forwardly projecting portions between the side edges of said front faces whereby to direct the material being kneaded toward the spaces between the side edges of the kneaders and the side walls of the trough.

4. In a kneading machine for rubber or the like, the combination of a kneading trough, and rotatable kneaders mounted therein having wide end surfaces, said surfaces being spaced unequal distances from the side walls of the trough, the front faces of said kneaders having forwardly projecting portions between the side edges of said front faces whereby to direct the material being kneaded toward the spaces between the side edges of the kneaders and the side walls of the trough.

5. In a kneading machine for rubber or the like, the combination of a kneading trough, and rotatable kneaders mounted therein having wide end surfaces, said surfaces being spaced unequal distances from the side walls of the trough in such a manner that wedge-shaped spaces are formed between the kneaders and the side walls of the trough, the front faces of said kneaders having forwardly projecting portions between the side edges of said front faces whereby to direct the material being kneaded toward the spaces between the side edges of the kneaders and the side walls of the trough.

In testimony whereof I have signed my name to this specification in the presence of two subscribing witnesses.

FRITZ KEMPTER.

Witnesses:
FRIDA KLAIBER,
ROSA THALBAUER.